United States Patent
Geng

(10) Patent No.: US 6,304,285 B1
(45) Date of Patent: Oct. 16, 2001

(54) METHOD AND APPARATUS FOR OMNIDIRECTIONAL IMAGING

(76) Inventor: Zheng Jason Geng, 4950 Cloister Dr., Rockville, MD (US) 20852

( * ) Notice: Subject to any disclaimer, the term of this patent is extended or adjusted under 35 U.S.C. 154(b) by 0 days.

(21) Appl. No.: 09/098,322

(22) Filed: Jun. 16, 1998

(51) Int. Cl.[7] .................................................. H04N 7/00
(52) U.S. Cl. ............................................................. 348/36
(58) Field of Search ................................. 348/36, 38, 39, 348/42; 250/208.1, 208.6; 356/28, 325, 318; 359/725, 726, 727, 728, 729; H04N 7/00

(56) References Cited

U.S. PATENT DOCUMENTS

| | | | |
|---|---|---|---|
| 5,612,533 | * 3/1997 | Judd et al. | 250/208.1 |
| 5,625,408 | * 4/1997 | Matsugu et al. | 348/42 |
| 5,760,826 | * 6/1998 | Yayar | 348/36 |
| 5,790,181 | * 8/1998 | Chahl et al. | 348/36 |
| 5,905,568 | * 5/1999 | Mchowell et al. | 356/28 |
| 5,920,337 | * 7/1999 | Glassman et al. | 348/36 |
| 6,034,779 | * 3/2000 | Yamaura | 356/375 |
| 6,064,423 | * 9/2000 | Geng | 348/36 |
| 6,118,474 | * 9/2000 | Nayar | 348/36 |
| 6,160,618 | * 12/2000 | Garner | 356/318 |

* cited by examiner

*Primary Examiner*—Chris Kelley
*Assistant Examiner*—Tung Vo

(57) ABSTRACT

An omnidirectional imaging system comprising a reflective mirror for viewing object within a hemispherical field of view form a single virtual view point at the local center of said reflective mirror, a projector for projecting a light beam toward said reflective mirror, and a variable wavelength filter optically positioned between said projector and said reflective mirror for generating a pattern having a spatially distributed wavelength spectrum of said reflective mirror, where a generator responsive to the hemispherical image data for generating three-dimensional image.

16 Claims, 4 Drawing Sheets

METHOD AND APPARATUS FOR OMNIDIRECTIONAL IMAGING

FIELD OF INVENTION

Figure 1:
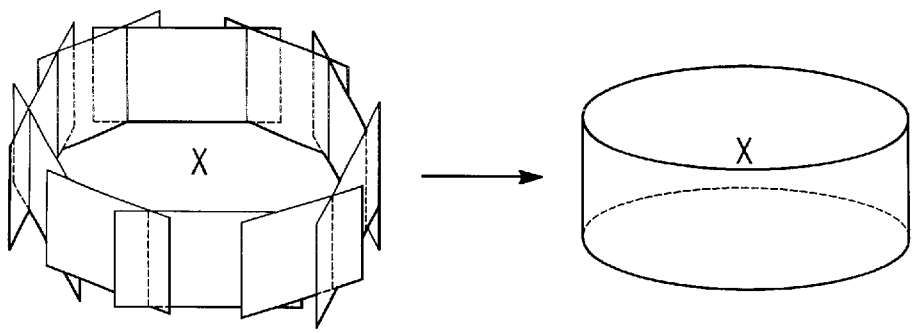

This invention presents a set of methods and apparatus for omnidirectional stereo imaging. By "omnidirectional imaging system", we mean a system that is able to acquire images with a field-of-view covering entire hemisphere (180 solid space angle), simultaneously without any mechanical moving part. The field of view of a conventional camera or a light projector can be dramatically increased by employing a reflective mirror properly placed in front of the camera or the projector. A pair of omnidirectional cameras is able to form a unique stereo imaging system that is able to obtain three dimensional images of surrounding scene with 360 degree view angle. A combination of an omnidirectional camera and an omnidirectional structured light projector can also provide a means to obtain quantitative three dimensional measurements of the objects around the camera system. The omnidirectional three dimensional imaging methods and apparatus presented herein may offer unique solutions to many practical systems that need simultaneous 360 degree viewing angle and three dimensional measurement capability.

1. PRIOR ART—EXISTING APPROACHES TO LARGE FOV IMAGING SYSTEM

A number of approaches had been proposed in the past for imaging systems to achieve wide field-of-view (FOV). None of them, however, is able to generate 3D omnidirectional images. In the following paragraphs, we give a briefly survey on the state-of-the-art of current imaging systems that seek to achieve wide FOV.

1.1. Conventional Cameras

Most existing imaging systems employ electronic sensor chips, or still photographic film, to record optical image collected by its optical lens system. The image projection for most camera lenses is modeled as a "pin-hole" with a single center of projection. Since sizes of camera lens and the imaging sensor have their practical limitations, the light rays that can be collected by a camera lens and received by the imaging device typically form a corn with very small opening angle. Therefore, angular field-of-views for conventional cameras are within a range of 5 to 50 degrees. For example, an 8.5 mm F/1.3 camera lens for ½" CCD (Charge Coupled Device) chip only has an angular FOV of 41.2 degree.

1.2. Fish-Eye Lenses

Optical engineers had designed several versions of wide-viewing-angle lens system, called the fish-eye lens (see [1],[2]). The fish-eye lens features a very short focal length which, when used in place of conventional camera lens, enables the camera to view object for much wider angle (almost 180 degree of hemisphere). In general, the wider FOV, the more complicated design the fish-eye lens has. To obtain a hemispherical FOV, the fish-eye lens must be quite large in dimension, complex in optical design, and hence expensive. Also, it is very difficult to design a fish-eye lens that ensures single view point constraint, i.e., all incoming principal light rays intersect at a single point to form a fixed viewpoint. This is indeed a problem with commercial fish-eye lenses, including Nikon's Fisheye-Nikkor 8-mm f/2.8 lens. The use of fish-eye lenses for wide FOV imaging application has been advocated by [3] and [4], among others. Although the acquired image by fish-eye lenses may prove to be good enough for some visualization applications, the distortion compensation issue has not been resolved, and the high unit-cost remain to be major hurdles for its wide-spread applications. The fish-eye lens technique has the advantage of adopting a statically positioned camera to acquire a wide angle of view. However the nonlinear property resulted from the semi-spherical optical lens mapping make the resolution along the circular boundary of the image very poor, while the field of view corresponding to the circular boundary of the image usually represents a ground or floor where a high resolution of image is required.

1.3. Multi-Camera System or Rotating Imaging Systems

Large field of view of objects may be obtained by using multiple cameras in the same system, each points towards a different direction. However, issues on seamless integration of multiple images is further complicated by the fact that image produced by each camera has different centers of projection. The cost for such a system is usually high. The image processing required by multiple cameras or rotating camera method to obtain a precise information on position and azimuth of an object takes a long time, which is not suitable for real-time battle field modeling and reconnaissance applications.

Another straightforward solution to increasing the FOV of an imaging system is to rotate the entire imaging system about its center of projection (FIG. 1). An image sequence acquired by the camera at different positions are "stitched" together to obtain a panoramic view of the scene. Such an approach has been recently proposed by several researchers (see [5], [6] [7]). A very interesting approach developed by [8] employs a camera with a non-frontal image detector to scan the world.

The first disadvantage of any rotating image system is that it requires the use of moving parts, and precision positioning devices. A more serious drawback is that such systems lack the capability of simultaneously a acquiring images with wide FOV. Although such system can acquire precise azimuth information in omnidirectional view, the imaging process is time-consuming and the method is not applicable to real-time problems such as avoiding collision against moving obstacles or monitoring scene with mobile objects. This restricts the use of rotating systems to static and non-real-time applications.

Figure 2:
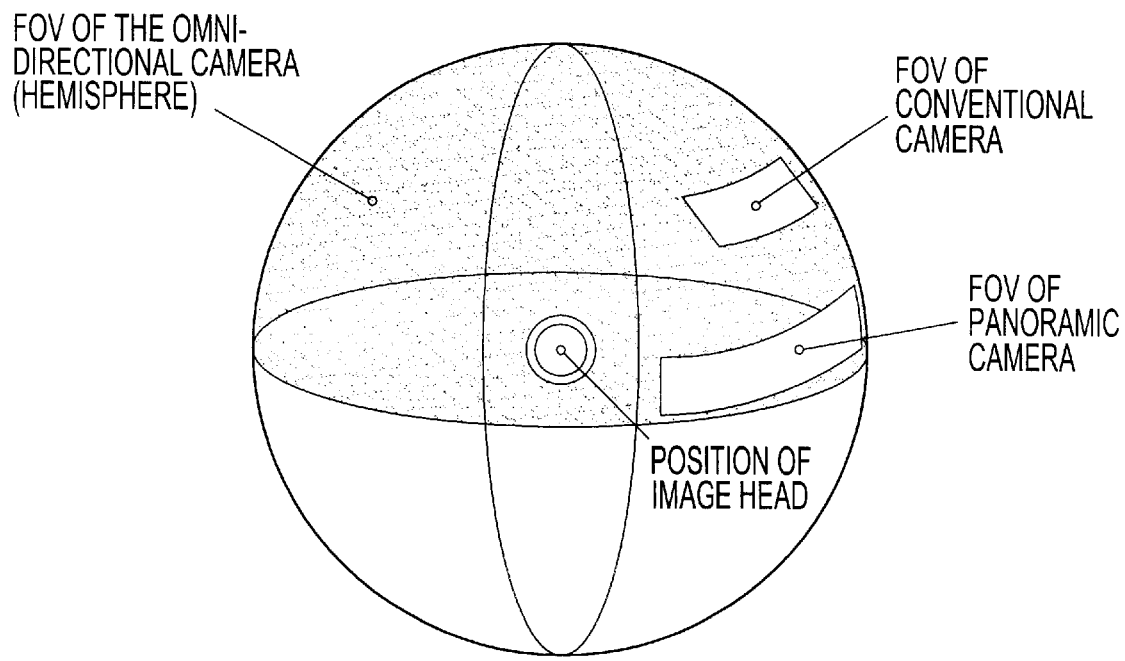

In contrast, the invention presented herein, called the omnidirectional camera, is capable of capturing real-time omnidirectional images without using any moving parts. By "omnidirectional images", we mean images with a field-of-view covering entire hemisphere (180 solid space angle), simultaneously. FIG. 2 provides a comparison between our Omnidirectional Camera, panoramic camera and conventional cameras. As one can see, a panoramic camera is still not ommidirectional, since it can only provide a wide-angle of FOV at certain time instance, not in all directions.

2. SUMMARY OF THE INVENTION

The primary objective of present invention is to provide a set of simple methods and apparatus to obtain simultaneously omnidirectional stereo images without using any moving parts. The field of view of a conventional camera or a light projector can be dramatically increased by employing a reflective mirror properly placed in front of the camera or the projector. A pair of omnidirectional cameras is able to form a unique stereo imaging system that is able to obtain three dimensional images of surrounding scene with 360 degree view angle. A combination of an omnidirectional camera and an omnidirectional structured light projector can also provide a means to obtain quantitative three dimensional measurements of the objects around the camera system. The omnidirectional three dimensional imaging methods and apparatus presented herein may offer unique solutions to many practical systems that need simultaneous 360 degree viewing angle and three dimensional measurement capability.

3. BRIEF DESCRIPTION OF THE DRAWING

FIG. 1 shows a conventional way to obtain panoramic images: the composition of multiple views of a rotated camera into a panoramic image.

FIG. 2 gives a comparison of the Field of View (FOV) among conventional cameras, panoramic cameras, and the proposed omnidirectional camera.

Figure 3:
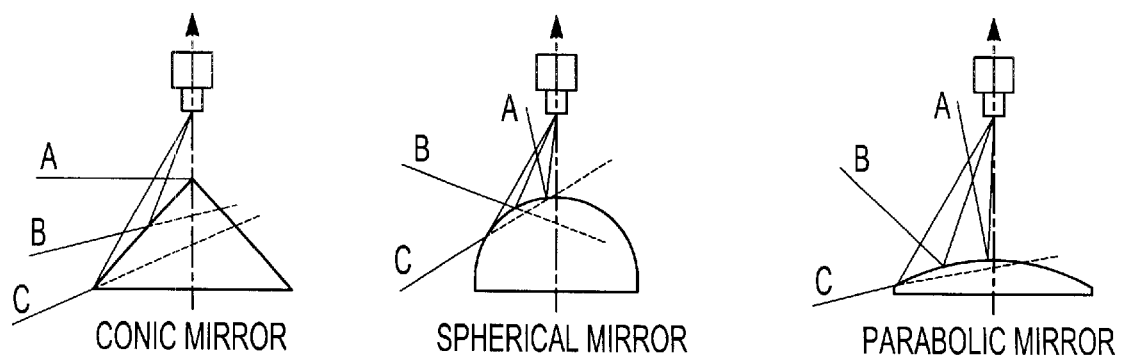

FIG. 3 provides examples of reflective convex mirror for Omni-Directional Imaging. Notice that these convex mirrors do not satisfy the single viewpoint constraint (SVC) condition: The (extension of) reflected rays do not meet at single viewpoint, i.e., the virtual viewpoint varies with rays' impinging location on the mirror FIG. 4. Acquire Omni-Directional Image from the OMNI-Mirror: A video camera placed at location C can "see" objects in an entire hemisphere FOV, from a single virtual viewpoint at mirror's focal center O.

Figure 5:
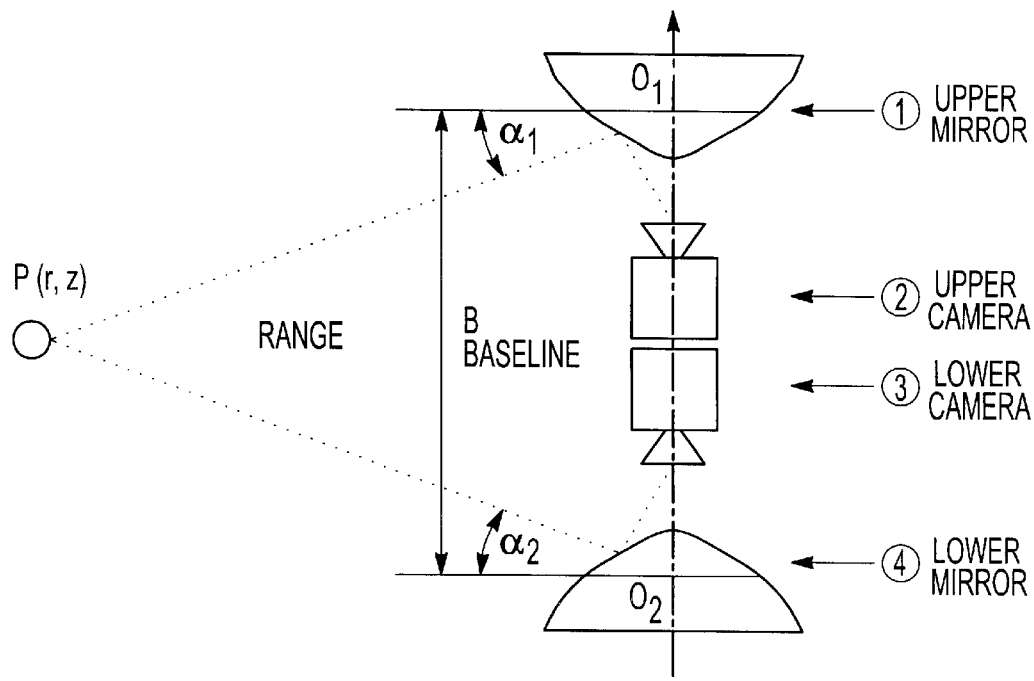

FIG. 5 shows an embodiment of the Omnidirectional 3D Camera.

Figure 6:
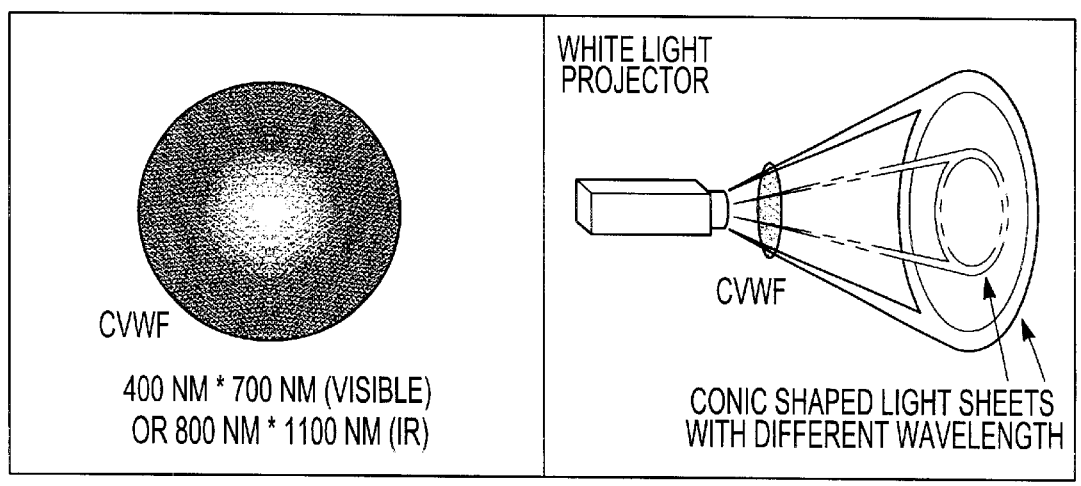

FIG. 6: Circular Variable Wavelength Filter (CVWF).

Figure 7:
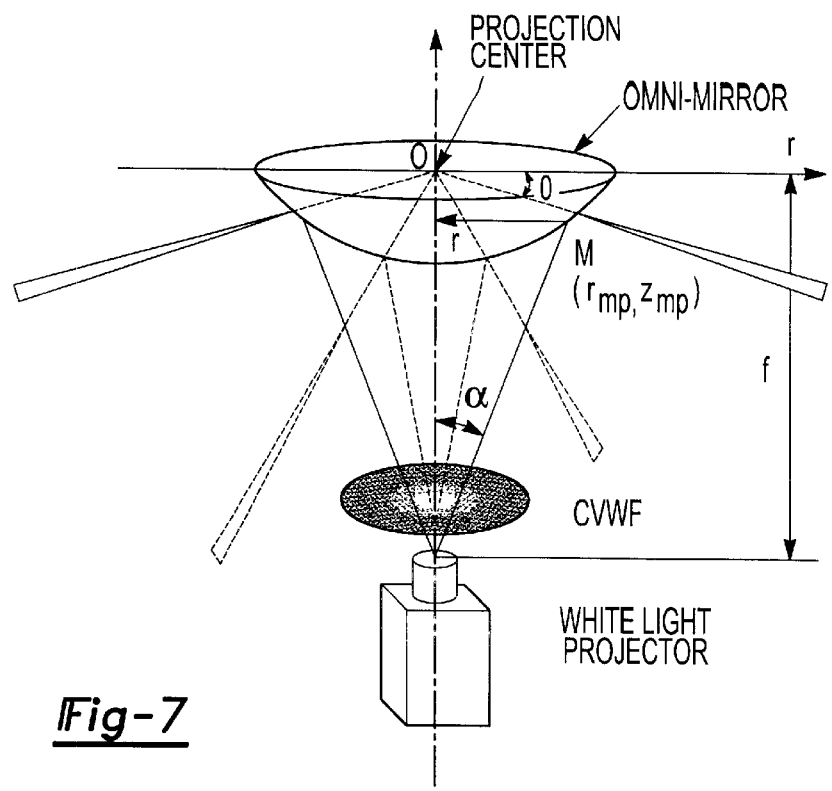

FIG. 7: Omni-directional Rainbow Light Projection Using the OMNI-Mirror and CVWF FIG. 8: Omnidirectional Structured Light 3D Camera

4. DESCRIPTION OF THE PREFERRED EMBODIMENTS 4.1. Obtaining Omnidirectional View Using Reflective Mirror To dramatically increase the field of view of an imaging system, we propose a somewhat unusual approach: using a reflective surface (i.e., convex mirror). The field of view of a video camera can be greatly increased by using reflective surface with properly designed surface shapes. The rear-view mirror in a car is a daily example of using reflective mirror to increase the FOV of a driver.

There are a number of surface profiles that can be used to produce omnidirectional FOV. FIG. 3 lists three examples: conic mirror, spherical mirror, and parabolic mirror. The optical geometry of these convex mirrors provides a simple and effective means to convert video camera's planar view into an omnidirectional view around the vertical axis of these mirrors, without using any moving part.

At the first glance, it appears that the omnidirectional imaging task can be accomplished by using ANY convex mirror. Unfortunately, this is not the case. In reviewing some basic of image formation, we know that an image is a two dimensional pattern of brightness (or colors). A satisfactory imaging system must preserve two essential characteristics:

(1) Geometric correspondence: There must be a one-to-one correspondence between pixels in an image and point in the scene.
(2) Single Viewpoint Constraint: Each pixel in the image corresponds to a particular viewing direction defined by a ray from that pixel on image plane through a "pinhole" (single viewing point).

Notice that, although the convex mirrors listed in FIG. 3 can greatly increase the FOV, and may prove adequate for certain omnidirectional scene monitoring applications, they are not satisfactory imaging devices. These reflecting surfaces do not preserve the single viewpoint constraint (SVC).

For a high quality omnidirectional imaging system, all the light rays coming in the omni imager head should have a single (virtual) viewing point.

4.2. Design of the Omni-Mirror That Meets the SVC

In this section, we will discuss a desirable convex mirror surface profile that satisfies the single viewpoint constraint: all the (extensions of) light rays reflected by the mirror must pass through a single (virtual) viewpoint. We call such a reflective mirror the OMNI-mirror.

Let us first define necessary symbols and terminology. As shown in the FIG. 4, we use an off-the-shelf video camera with a regular lens whose FOV covers entire surface of the OMNI-mirror. Since the optical design of camera and lens is rotationally symmetric, all we need to determine is the cross-section function $z(r)$ that defines the mirror surface cross section profile. The mirror is then the solid of revolution obtained by sweeping the cross-section about the optical axis. The function of the omni-mirror is to reflect all viewing rays coming from video camera's viewing center (focal point, labeled as C) to the surface of physical objects in the field-of-view. The key feature of this reflection is that all such reflected rays must have a projection towards a single virtual viewing point at mirror's focal center, labeled as O. In other words, the mirror should effectively steer viewing rays such that the camera equivalently sees the objects in the world from a single viewpoint O.

Figure 4:
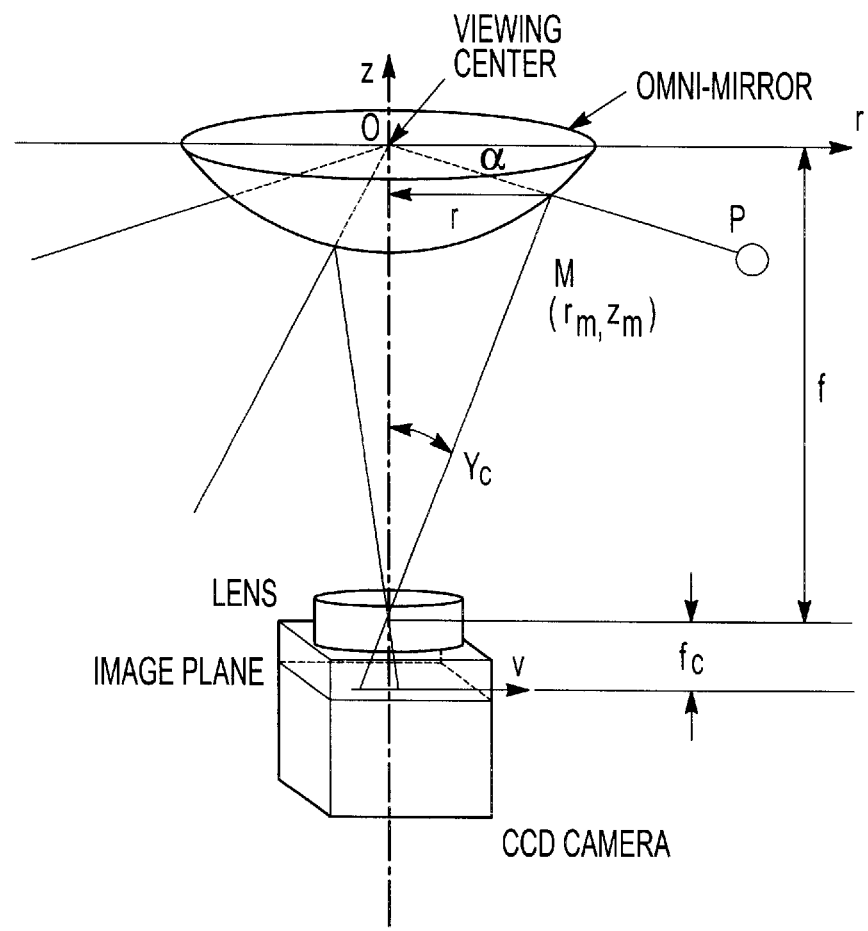

We choose hyperboloid as the desirable shape of the Omni-mirrors. A well-know feature of a hyperbolic curve is that: the extension of any ray reflected by the hyperbolic curve originated from one of its focal points passes through its another focal point. If we choose the hyperbolic profile for the OMNI-mirror, and place a video camera at its focal point C, as shown in FIG. 4, the imaging system will have a single viewpoint at its another focal point O, as if the video camera were placed at the virtual viewing location O.

The mathematical equation that describe the hyperbolic Omni-Mirror surface profile is:

$$\frac{(z+c)^2}{b^2} - \frac{r^2}{a^2} = 1, \quad \text{where} \quad c = \sqrt{a^2+b^2} \quad \text{and} \quad f = 2c. \tag{1}$$

The unique feature of the Omni-Mirror is that the extension of the incoming light ray sensed by the CCD camera is always passing through a single virtual viewpoint O regardless of the location of the projection point M on the mirror surface.

4.3. Acquiring Image Using an Omni Mirror

For any point P in the scene, the image reflected from the OMNI mirror to image sensor's image plane has the radius of dc:

$$d_c = \sqrt{u^2 + v^2} \tag{2}$$

where u and v are the pixel indexes on the image plane. As shown in FIG. 4, the camera viewing angle corresponding to the point on the scene is given by:

$$\gamma_c = \tan^{-1}\frac{d_c}{f_c} \tag{3}$$

The incoming light ray to the camera can be described by a line equation:

$$z = \frac{r}{\tan\gamma_c} - f \quad (4)$$

Omitting details of mathematical derivation based on the OMNI-Mirror equation (1), we can obtain a simple closed-form relationship between the omnidirectional viewing angle $\alpha$ and CCD camera's viewing angle $\gamma_c$:

$$\alpha = \tan^{-1}\frac{2bc - (b^2 + c^2)\cos\gamma_c}{a^2 \sin\gamma_c} \quad (5)$$

This equation establishes a one-to-one corresponding relationship between $\alpha$. and $\gamma_c$. This relationship is important when we perform triangulation calculation in the omnidirectional 3D camera system.

4.4 First Embodiment: Omnidirectional Stereo Camera (OSC)

With a pair of the omnidirectional cameras, we can easily construct an omnidirectional stereo camera. FIG. 5 shows a possible configuration of the OSC. Two omni-mirrors are placed face-to-face with optical axes aligned. The virtual imaging centers, $O_1$ and $O_2$, are separated by a distance of B, which forms the baseline for the stereo vision.

The triangulation can be carried out directly from omnidirectional images without the need for image conversion. Once a 3D object is detected in the omnidirectional image, the viewing angle $\gamma_1$ and $\gamma_2$ can be determined from cameras' geometry. Based on equation (5), the virtual viewing angles of this 3D object, $\alpha_1$ and $\alpha_2$, from the virtual viewpoint $O_1$ and $O_2$, can be determined. The distance between one of the viewing center and the 3D object in the scene cane be calculated using straight forward triangulation principle:

$$R = \frac{\cos(\alpha_2)}{\sin(\alpha_1 + \alpha_2)}B \quad (6)$$

where R is the Range, i.e. distance between P and $O_1$.

4.5. Second Embodiment: Omnidirectional Structured Light 3D Camera

4.5.1 Projecting Structured Illumination Using the OMNI-Mirror Circular Variable Wavelength Filter (CVWF)

Notice that in our Omni 3D camera system, a circular variable wavelength filter (CVWF) is used to facilitate the generation of 360° projection illumination through a convex mirror.

The CVWF is a circular optical glass plate coated with color rings of gradually varying wavelengths within visible (400–700 nm) or IR (>700nm) region. The wavelengths of the coated color rings are linearly proportional to their radians measured from the center of the filter glass. This feature provides a simple and elegant way of generating structured light for an entire scene without using any moving parts (FIG. 6).

The wavelength of the light $\gamma$ passing through a particular position of the CVWF is a linear function of r, the radians measured from the center of the filter glass:

$$\lambda(r) = \lambda_c + \frac{(\lambda_o - \lambda_c)}{R}r \quad (7)$$

where $\gamma_c$, $\gamma_o$ and R are filter parameters: $\gamma_c$ is the wavelength corresponding to the filter's "center" (lowest wavelength color the filter can generate). $\gamma_o$ is the wavelength corresponding to the filter's "edge" (highest wavelength color the filter can generate). R is the effective radian of the filter's "edge". And r is the radians measured from the center of the filter glass.

If the relative position of the CVWF is fixed with respect to the white light projector, the projected light with the same wavelength forms light sheets of circular conic shapes. The cone angle $\theta$ between the light sheet and the normal line of the projector is directly related to the wavelength of the light. In other word, the wavelength of the light is encoded with the geometric information of the projected corn angle. This fixed wavelength $\gamma$ -to-angle $\theta$ relationship is the key idea for our rainbow 3D camera system.

Omni-directional Rainbow Light Projection Using the OMNI-Mirror

In order to obtain a Rainbow-like illumination with 360° omnidirectional projecting angle, we use an Omni-Mirror to reflect the conic-shaped light sheets generated by the white light projector and a CVWF. As shown in FIG. 7, the projection system has a 360° effective projecting angle around the vertical axis of the OMNI mirror.

The OMNI-Mirror mapping provides an easy and elegant way to determine the projecting angle $\theta$ of a conic light sheet based on the projection angle of the white light projector (WLP) $\gamma$. The projection line equation is given by:

$$z = \frac{r}{\tan\gamma} - f \quad (8)$$

Combining with the OMNI-Mirror equation $$\frac{(z-c)^2}{b^2} - \frac{r^2}{a^2} = 1, \quad \text{where} \quad c = \sqrt{a^2 + b^2} \quad (9)$$

the reflecting point ($r_{mp}$, $Z_{mp}$) on the mirror can be calculated by solving a quadratic equation. Using some properties of the OMNI-Mirror and simplification procedures in mathematical manipulations, the relationship between the white light projection angle $\gamma$, and the omni-projection angle $\theta$ can then be expressed as:

$$\alpha = \tan^{-1}\frac{2bc - (b^2 + c^2)\cos\gamma}{a^2 \sin\gamma} \quad (10)$$

In other words, knowing the white light projection angle $\gamma$ and parameters of the OMNI-Mirror, the omni-projection angle $\theta$ is fully determined. Since the value of $\gamma$ determines the projected wavelength in the rainbow spectrum $\lambda$, spatial geometric characteristics of the projected cone shape Rainbow light sheet are fully defined. Although the 3D range calculation of the Omni-3D camera does not require the precise relationship between $\theta$ and $\lambda$, such a concise relationship facilitates a simple design, implementation and tests of the omnidirectional rainbow light projector.

4.5.2. Omnidirectional Structured Light 3D Camera

Figure 8:
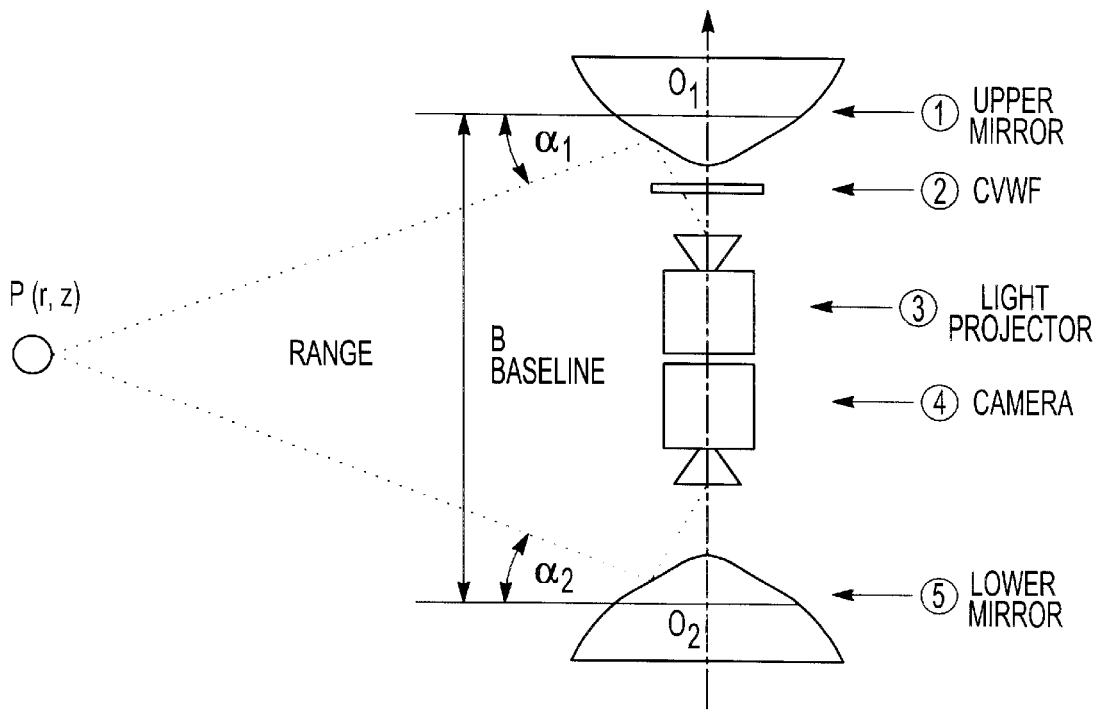

FIG. 8 shows an embodiment of an omnidirectional structured light 3D camera. An omnidirectional rainbow light projector is used herein to produce a spatially varying wavelength illumination in the surrounding scene. An omnidirectional camera is placed co-axially (i.e., with optical axes aligned) with the omni-rainbow projector. The virtual projection centers, $O_1$, and the virtual imaging center $O_2$, are separated by a distance of B, which forms the baseline for the triangulation based 3D vision system. The triangulation can be carried out directly from the omnidirectional images without the need for image conversion. Once a 3D object is detected in the omnidirectional image, the viewing angle $\gamma_2$ is determined from cameras' geometry. The projection angle $\gamma_1$ is determined from the wavelength of the structured light projection, due to the one-to-one corresponding relationship of the Rainbow projector between the wavelength and the projection angle. The distance between the virtual imaging center $O_2$ and the surface points on the 3D object in the scene can be calculated using straight forward triangulation principle:

$$R = \frac{\cos(\alpha_2)}{\sin(\alpha_1 + \alpha_2)} B. \tag{11}$$

The invention claimed is:

1. An omnidirectional imaging system comprising:
   a reflective mirror for viewing objects within a hemispherical field of view from a single virtual viewpoint at the focal center of said reflective mirror;
   an image sensor that generates hemispherical image data signals in response to light rays reflected from said reflective mirror;
   a projector for projecting a light beam toward said reflective mirror;
   a variable wavelength filter optically positioned between said projector and said reflective mirror for generating a pattern having a spatially distributed wavelength spectrum on said reflective mirror; and
   a data generator responsive to said hemispherical image data signals for generating three-dimensional data for objects within said hemispherical field of view.

2. The omnidirectional camera system of claim 1, wherein said reflective mirror is aligned with the optical axis of said image sensor.

3. The apparatus of claim 1, wherein the reflective mirror is a substantially hyperbolic mirror.

4. The apparatus of claim 1, wherein the spatially distributed wavelength spectrum generated by the variable wavelength filter comprises a rainbow-like pattern.

5. The apparatus of claim 4, wherein the rainbow-like pattern is a plurality of light rings, and wherein the wavelength of the rainbow-like light rings are proportional to respective positions of said rings measured in radians from the center of said variable wavelength filter.

6. The apparatus of claim 1, further comprising a position calculator responsive to predetermined geometric parameters of said reflective mirror, of said projector and of said video sensor, wherein said position calculator determines unique distance measurements for objects in said field of view of said video sensor.

7. An improved method for generating two dimensional video images of a scene, comprising the steps of:
   positioning a reflective mirror structured to satisfy an optical single viewpoint constraint for viewing objects within said scene of a hemispherical field of view;
   projecting a light beam toward said reflective mirror;
   generating a pattern having a spatially distributed wavelength spectrum on said reflective mirror using a variable wavelength filter;
   actuating a video sensor optically aligned with said reflective mirror for generating hemispherical video image data signals in response to light rays reflected from said reflective mirror, wherein said video sensor views objects within a hemispherical field of view from a single virtual viewpoint at the focal center of said reflective mirror; and
   storing said hemispherical image data signals.

8. The method of claim 7, wherein the reflective mirror used in the positioning step is substantially hyperbolic.

9. The method of claim 7, wherein the pattern formed in the generating step is a rainbow-like pattern.

10. The method of claim 9, wherein the rainbow-like pattern formed in the generating step is a plurality of light rings, and wherein the wavelength of the rainbow-like light rings are proportional to respective positions of said rings measured in radians from the center of the variable wavelength filter.

11. The method of claim 7, further comprising the step of determining unique distance measurements for objects in the field of view of said video sensor using a position calculator responsive to predetermined geometric parameters of the reflective mirror, of the projector and of the video sensor.

12. An omnidirectional imaging apparatus, comprising:
   a first reflective mirror configured to satisfy an optical single viewpoint constraint;
   an image sensor optically aligned with said first reflective mirror for generating two dimensional image data signals;
   a second reflective mirror disposed in a spaced relationship with respect to said first reflective mirror such that a reflective surface on said first reflective mirror faces a reflective surface on said second reflective mirror;
   a projector for projecting a light beam toward said second reflective mirror; and
   a variable wavelength filter optically positioned between said projector and said second reflective mirror for generating a pattern having a spatially distributed wavelength spectrum on said second reflective mirror.

13. The apparatus of claim 12, wherein the first and second reflective mirrors are substantially hyperbolic mirrors.

14. The apparatus of claim 12, wherein the spatially distributed wavelength spectrum generated by the variable wavelength filter comprises a rainbow-like pattern.

15. The apparatus of claim 14, wherein the rainbow-like pattern is a plurality of light rings, and wherein the wavelength of the rainbow-like light rings are proportional to respective positions of said rings measured in radians from the center of said variable wavelength filter.

16. The apparatus of claim 12, further comprising a position calculator responsive to predetermined geometric parameters of said first and second reflective mirrors, of said projector and of said video sensor, wherein said position calculator determines unique distance measurements for objects in said field of view of said video sensor.

* * * * *